(Model.)

J. B. & H. GREENHALGH.
NUT LOCK.

No. 281,055. Patented July 10, 1883.

WITNESSES:
Otto B. Yzer
C. Sedgwick

INVENTOR:
J. B. Greenhalgh
H. Greenhalgh
BY Munn & Co.
ATTORNEYS.

UNITED STATES PATENT OFFICE.

JOHN B. GREENHALGH AND HENRY GREENHALGH, OF BLACKSTONE, MASS.

NUT-LOCK.

SPECIFICATION forming part of Letters Patent No. 281,055, dated July 10, 1883.

Application filed December 30, 1882. (Model.)

*To all whom it may concern:*

Be it known that we, JOHN B. GREENHALGH and HENRY GREENHALGH, both of Blackstone, in the county of Worcester and State of Massachusetts, have invented a new and Improved Nut-Lock, of which the following is a full, clear, and exact description.

Reference is to be had to the accompanying drawings, forming part of this specification, in which similar letters of reference indicate corresponding parts in all the figures.

Figure 1:
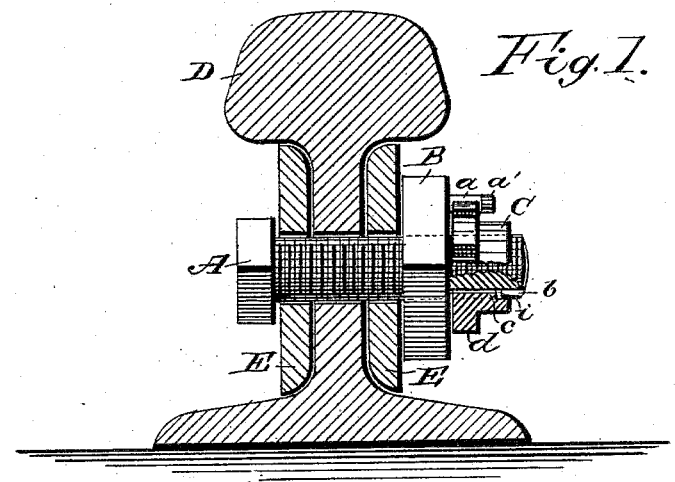
Figure 2:
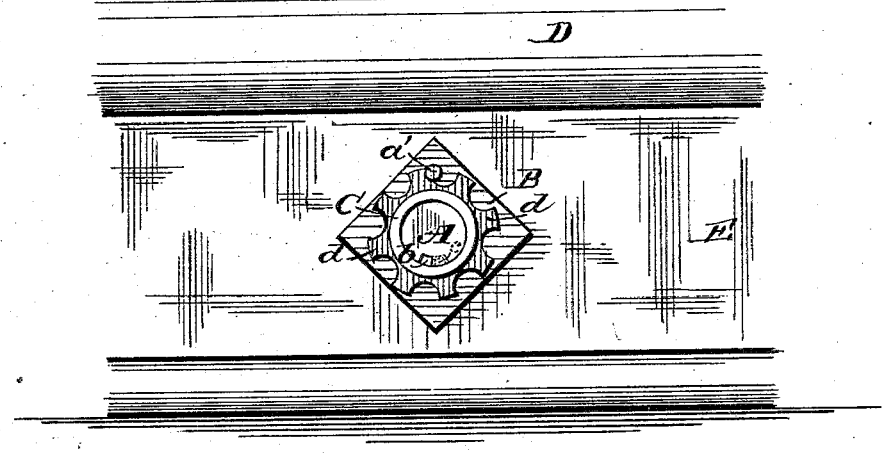
Figure 3:
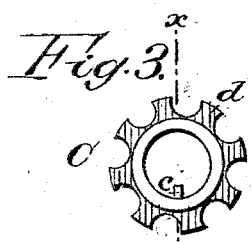
Figure 4:
Figure 5:
Figure 6:
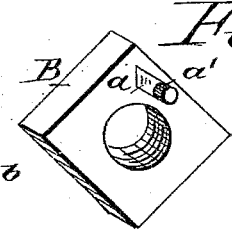

Figure 1 is a sectional elevation, showing our invention applied to railroad-rail joints. Fig. 2 is a side elevation of the same. Fig. 3 is a face view of the locking-ring removed. Fig. 4 is a sectional elevation of the same. Fig. 5 is a view of the bolt with the nut and locking-ring removed, and Fig. 6 is a perspective view of the nut.

A represents the bolt, which is formed with the longitudinal slot $b$. B represents the nut, which is provided with the pin $a$; and C represents the locking-ring, which is formed upon the inside with the pin, rib, or feather $c$, and upon the outside with the radial projections $d$ $d$, that reach a distance from the main body of the locking-ring somewhat greater than the distance the pin $a$ stands from the hole in the nut B. The pin $a$ is faced off to form the side projection or notch $a'$, as shown in Figs. 1 and 6. The slot $b$ is by preference enlarged a short distance below the extremity of the bolt to form the offset $i$, as clearly shown in Fig. 5.

In applying our invention the bolt A is first passed through the objects to be secured—in the drawings through the rail D and fish-plates E E. The nut B is then screwed upon the bolt as far as it will go. The locking-ring C is then put upon the bolt, the feather $c$ entering the slot $b$, and the pin $a$ coming between some two of the radial projections $d$. The nut B will then be slightly set back, which will bring one of the projections $d$ under the projection $a'$ of the pin $a$, and the feather $c$ under the offset $i$, thus securely locking the nut B and bolt A together. In most cases the offset $i$ of the bolt A will not be required, as the notch $a'$ of the pin $a$ will be found to be quite sufficient to hold it secure against any jar or concussion, and, if preferred, the end of the bolt A could be made square or of any other shape, and the hole through the locking-ring made to correspond to answer in place of the slot in the bolt and the feather in the locking-ring; and instead of one pin $a$ two or more might be firmly fixed in the nut for locking the locking-ring, and not depart from the spirit of our invention.

The advantages of this nut-lock are that it is cheap, easily applied, perfectly reliable and secure, and will not be affected by any changes of temperature to which the bolt may be subjected.

Having thus described our invention, we claim as new and desire to secure by Letters Patent—

1. The bolt A, having the slot $b$, and the nut B, having the pin $a$, in combination with the locking-ring C, having the projections $d$ and fin or pin $c$, as and for the purposes set forth.

2. The bolt A, having the slot $b$ and offset $i$, and the nut B, having the pin $a$, faced off to form the notch $a'$, in combination with the locking-ring C, having the projections $d$, and internal feather, $c$, as and for the purposes set forth.

JOHN B. GREENHALGH.
HENRY GREENHALGH.

Witnesses:
JOSEPH J. HULBERT,
CHARLES STAUDINGER.